United States Patent Office 3,393,226
Patented July 16, 1968

3,393,226
OXIDATIVELY STABLE ESTERS
Brian Ronald David Whitear, London, England, assignor to The British Petroleum Company Limited, London, England, a corporation of England
No Drawing. Filed Sept. 29, 1964, Ser. No. 400,242
Claims priority, application Great Britain, Oct. 11, 1963, 40,175/63
5 Claims. (Cl. 260—479)

ABSTRACT OF THE DISCLOSURE

Novel esters of the following formula are provided $$CH_3OCO(CH_2)_nCOOC_6H_4R$$

where R is a phenyl or phenoxy group and $n$ is an integer from 1 to 5, said esters having high oxidation stability and utility as lubricants and heat transfer fluid.

---

This invention relates to certain novel esters having high oxidation stability and utility as lubricants or heat transfer fluids.

The said novel esters are those of the general formula $$CH_3.O.CO(CH_2)_nCO.O.C_6H_4.R \quad \text{(Formula I)}$$

where R is a phenyl or phenoxy group, preferably attached to the phenylene group in the ortho or meta position, and $n=1$–5, preferably 2 or 3.

The invention also includes a method of preparing the esters described above, in which an acid halide of the formula:

$$CH_3.O.CO(CH_2)_nCO.X$$

is reacted with a compound of the formula:

$$MO.C_6H_4.R$$

wherein:

X is a halogen atom
M is an alkali metal atom, preferably a sodium or potassium atom, or a hydrogen atom,
R is a phenyl or phenoxy group, preferably attached to the phenylene group in the ortho or meta position, and
$n=1$–5.

the reaction being conducted so as to eliminate a salt MX with the production of an ester as described above.

The acid halides specified above may be prepared by refluxing the appropriate methyl half ester with thionyl chloride in the usual way. The methyl half esters can be isolated by suitable methods from the mixture of dibasic acid, half ester and diester obtained by reacting dibasic acid and diester under trans esterification conditions (see, for example, G. B. Brown et al., Journal of Organic Chemistry, volume 12, page 163 (1947)). The succinic and glutaric half esters ($n=2$ and 3 respectively) can, however, be more conveniently prepared by reacting one molar proportion of the appropriate acid anhydride with one or more molar proportions of methanol followed by removal of the excess alcohol by distillation.

By way of example, the preparation of three esters according to the invention will now be described.

Ester A.—Methyl o-phenylphenyl succinate

Succinic anhydride (50 g.) and methanol (50 g.) were heated under reflux for 2 hours. The excess solvent was a distilled off and the residue of the crude methyl half ester of succinic acid solidified (M.P. 50° C. approx). This material was treated with thionyl chloride (70 ml.) and the mixture was gently refluxed. The reaction mixture was distilled and the fraction boiling over the range 108–111° C./15 mm. was taken as the acid chloride of the methyl half ester of succinic acid (yield: 60 g.).

The sodium salt of o-phenylphenol (20 g.) was refluxed with the acid chloride of the methyl half ester of succinic acid (15 g.) in benzene and the reaction product was washed with dilute aqueous caustic potash, dried and distilled. The fraction boiling over the range 154–158° C./0.1 mm. was taken as methyl o-phenylphenyl succinate (yield: 25 g.).

Ester B.—Methyl m-phenoxyphenyl succinate m-Phenoxyphenol (24 g.) was refluxed with the acid chloride of the methyl half ester of succinic acid (20 g.) in benzene for 24 hours. The reaction product was washed with dilute aqueous caustic potash, dried and distilled. The fraction boiling over the range 174–176° C./0.05 mm. was taken as methyl m-phenoxyphenyl succinate (yield: 31 g.).

Ester C.—Methyl m-phenoxyphenyl glutarate m-Phenoxyphenol (55.8 g.) was refluxed with the acid chloride of the methyl half ester of glutaric acid (44.6 g.) in benzene for 24 hours. The reaction product was washed with dilute aqueous caustic potash dried and distilled. The fraction boiling over the range 188–193° C./0.3 mm. was taken as methyl m-phenoxyphenyl glutarate (yield: 38 g.).

The oxidation stability of Esters A, B and C and of two other experimental ester lubricants for aero-turbine engines, X and Y, noted for their good high temperature oxidation stability properties, were assessed in a laboratory oxidation rig in which three litres per hour of air were passed through a 10 ml. sample of the oil contained in a tube kept for 12 hours in an oil bath at 260° C. The degree of oxidative breakdown of the esters is assessed by measuring the percent change in the kinematic viscosity of the ester at 210° F. and the acidity increase. In the case of esters X and Y, tests were also carried out on them after they had been inhibited with 2% wt. of iminodibenzyl, a known antioxidant for synthetic lubricants intended for use at very high temperatures. Results of the tests are given in the following table.

TABLE

| Ester | Antioxidant | Boiling range of ester | Viscosity of ester at 210° F. (centistokes) | Oxidation Test | |
|---|---|---|---|---|---|
| | | | | 210° F. viscosity change, percent | Acidity increase, mg. KOH/g. |
| A | None | 154–158° C. at 0.1 mm. Hg | 4.9 | −4 | 1.5 |
| B | do | 174–176° C. at 0.5 mm. Hg | 4.37 | +5 | 2.5 |
| C | do | 188–193° C. at 0.3 mm. Hg | 4.29 | +20 | 3.3 |
| X | do | 220° C. at 1 mm. Hg | 5.0 | +295 | 25.75 |
| Y | do | 220° C. at 1 mm. Hg | 7.1 | +250 | 20.3 |
| X | 2% wt. IDB | | | +70 | 12.05 |
| Y | 2% wt. IDB | | | +65 | 10.30 |

IDB=Iminodibenzyl.

The outstanding oxidation stability of the esters according to the invention is clearly demonstrated.

Ester X was prepared by reacting together under esterification conditions 28:10:1 molar mixture of caprylic acid, trimethylolpropane and sebacic acid. Ester Y was prepared by reacting together under esterification conditions a 10:4:1 molar mixture of caprylic acid, trimethylolpropane and sebacic acid.

I claim:

1. Novel esters of the general formula:

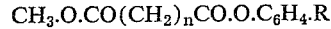

$$CH_3.O.CO(CH_2)_nCO.O.C_6H_4.R$$

where:
R is selected from the group consisting of phenyl and phenoxy groups, and
$n$ is an integer from 1–5.

2. An ester according to claim 1, in which the group R is attached to the phenylene group in the ortho position.

3. An ester according to claim 1, in which the group R is attached to the phenylene group in the meta position.

4. An ester according to claim 1, in which $n=2$.

5. An ester according to claim 1, in which $n=3$.

References Cited

UNITED STATES PATENTS 3,067,239  12/1962  Mills _____ 260—479

OTHER REFERENCES

Ivashchenko et al.: Zh. Obshch Khim. 32 (1962), 3765–8. QD1Z6.

LORRAINE A. WEINBERGER, *Primary Examiner.*

M. WEBETER, M. G. BERGEN, *Assistant Examiners.*

UNITED STATES PATENT OFFICE
CERTIFICATE OF CORRECTION

Patent No. 3,393,226                        July 16, 1968

Brian Ronald David Whitear

It is certified that error appears in the above identified patent and that said Letters Patent are hereby corrected as shown below:

Columns 1 and 2, in the TABLE, fourth column, line 1 thereof, "4.9" should read -- 4.99 --.

Signed and sealed this 9th day of December 1969.

(SEAL)
Attest:

Edward M. Fletcher, Jr.
Attesting Officer

WILLIAM E. SCHUYLER, JR.
Commissioner of Patents